United States Patent [19]
Matsunaga et al.

[11] Patent Number: 5,397,175
[45] Date of Patent: Mar. 14, 1995

[54] FLUID PRESSURE CONTROL APPARATUS FOR ANTISKID BRAKES

[75] Inventors: Kunihiro Matsunaga; Toshio Takayama; Hiromi Ando, all of Yamanashi, Japan

[73] Assignee: Tokico Ltd., Japan

[21] Appl. No.: 18,054

[22] Filed: Feb. 16, 1993

[30] Foreign Application Priority Data

Mar. 6, 1992 [JP] Japan .................. 4-050035
May 29, 1992 [JP] Japan .................. 4-139277

[51] Int. Cl.⁶ .............................................. B60T 8/00
[52] U.S. Cl. .................. 303/117.1; 303/116.1; 303/119.1
[58] Field of Search ........... 303/116.2, 117.1, 116.1, 303/119.1, 113.1, DIG. 900, DIG. 901

[56] References Cited

U.S. PATENT DOCUMENTS

| | | | |
|---|---|---|---|
| 4,715,666 | 12/1987 | Farr | 303/116 |
| 4,846,535 | 7/1989 | Kuwana et al. | 303/117.1 |
| 4,915,459 | 4/1990 | Hashida et al. | 303/119 |
| 4,988,148 | 1/1991 | Farr et al. | 303/116 |

FOREIGN PATENT DOCUMENTS

| | | | |
|---|---|---|---|
| 303261 | 2/1989 | European Pat. Off. | 303/116.1 |
| 143252 | 6/1986 | Japan | 303/116.1 |
| 268559 | 11/1986 | Japan | 303/116.1 |
| 223838 | 4/1988 | Japan | 303/117.1 |
| 287437 | 12/1991 | Japan | 303/116.1 |

Primary Examiner—Robert J. Oberleitner
Assistant Examiner—Peter M. Poon
Attorney, Agent, or Firm—Biebel & French

[57] ABSTRACT

The present invention presents an economical fluid pressure control device particularly applicable to controlling the fluid pressure in the wheels of an automobile provided with an antiskid capability so that the unpleasant pedal kickbacks are prevented under various operating conditions of the wheels. This is achieved by providing at least two wheel cylinders for one pressure generation source, a reservoir and a pump. A flow valve provided on each of the wheel cylinders is provided with a simple flow switching device which control the position of a spool, disposed inside the flow valve, which assumes a stationary position for non-antiskid operation mode and a operation position for antiskid operation mode. When one of the wheels is in the antiskid operation mode, and the other wheel is in non-antiskid operation mode, the brake fluid discharged from the pump is not allowed to enter the flow valve disposed in the non-antiskid operation mode. Therefore, the fluid pressure pulsations generated in the fluid circuit in the antiskid operation mode are not transmitted back to the pressure generation source through the flow valve in the non-antiskid operation mode. Therefore, there in no transmission of unpleasant pedal kickbacks at the pressure generation source.

18 Claims, 7 Drawing Sheets

FLUID PRESSURE CONTROL APPARATUS FOR ANTISKID BRAKES

BACKGROUND OF THE INVENTION

1. Field of the Invention

This invention relates in general to fluid pressure control systems, and in particular to a braking apparatus having an antiskid control capability for use in automotive vehicles.

2. Technological Background

The brake fluid control apparatuses for conventional antiskid controllers for preventing locking of the wheels include a master cylinder provided with a fluid pressure generator, wheel cylinders, a reservoir and a pump, in which the intercommunication flow of the brake fluid between the various components are controlled with valves and normally closed valves. Some of these apparatuses are designed to prevent the transmission of fluid pulsations, produced by the pumping action during the antiskid operation, which are transmitted back to the fluid pressure generator (causing pedal kickbacks), for example, as disclosed in a U.S. patent application Ser. No. 904,988 by the present inventors.

The four wheeled vehicles which use such antiskid apparatus are normally provided with a dual brakeline system: a cross (X) line system and a front-back line system. In the X line system, the left front wheel cylinder and the right rear wheel cylinder are on a common line, and the right front wheel cylinder and the left rear wheel cylinder are on a common line. In the front-back line system, the front two wheels are on a common line and the rear two wheels are on another common line. With such dual line systems, even if one brakeline fails, it is possible to control the vehicle by the remaining sound brakeline. Adapting an antiskid apparatus on vehicles having a dual brakeline system is costly, because it is necessary to provide one flow valve and one normally-closed (n/c) valve for each wheel cylinder. However, it is possible to economize by using a common pump in a fluid circuit which is connected to one fluid pressure generation source of a master cylinder.

When an antiskid apparatus sharing a reservoir and a pump in one line is activated, it is possible to prevent the pressure pulsations to be transmitted back to the pressure generation source through the flow valve which is in the antiskid operation mode. However, the pressure pulsations can still feedback to the pressure generation source through the flow valve in the fluid circuit which is not in the antiskid operation mode, because the flow valve which communicates the pressure generation source with the discharge fluid circuit of the pump has a large fluid passage, and the pressure pulsations can be transmitted through the large passage back to the pressure generation source, thus causing unpleasant pedal kickbacks at the pressure generation source.

SUMMARY OF THE INVENTION

The purpose of the present invention is to present a brake fluid pressure control apparatus which enables the use of one common pump in one brakeline system providing a smooth antiskid operation without generating unpleasant pedal kickbacks at the pressure generation source.

To accomplish the above objective, the present invention presents a fluid pressure control apparatus for use in a braking system provided with an antiskid control capability for an automotive vehicle: the apparatus comprises:

(a) a fluid pressure generation source which generates a brake fluid pressure upon pressing of a brake pedal;

(b) at least two wheel cylinders, which are provided for a fluid pressure generation source;

(c) a reservoir for holding discharged brake fluid from said wheel cylinders;

(d) a normally-closed (n/c) valve for each of said at least two wheel cylinders for controlling the communication between said reservoir and said at least two wheel cylinders;

(e) a pump for withdrawing the brake fluid from said reservoir and discharge the brake fluid to one of said reservoir or a wheel cylinder;

(f) a flow valve provided for each of said at least two wheel cylinders for allowing the brake fluid to flow through in accordance with the actions of a spool which is disposed within said flow valve in response to a n/c valve;

(g) a controller which controls said at least two n/c valves in accordance with the rotational motion of said wheels; and (h) flow switching means for controlling the flow of brake fluid into said flow valve in accordance with the actions of said spool; wherein when said spool is in a stationary position for a normal braking operation, said n/c valve is closed, and said fluid pressure generation source is communicated with said wheel cylinder, and the flow of brake fluid from the discharge fluid circuit of said pump into the flow switching means is essentially shut off; and when said spool is in an operating position and said n/c valve is open, the communication between said fluid pressure generation source and said wheel cylinder is essentially shut off; and the communication between said pressure generation source and the discharge fluid circuit of said pump is essentially shut off; while the communication between said reservoir and said wheel cylinder is open, when said spool is in said operating position and said n/c valve is closed, the brake fluid discharged from the pump is supplied to said wheel cylinder.

According to a brake system of such a configuration, the principle of isolating the fluid pressure pulsations caused by the pump operating to generate fluid pressure in the intercommunicating fluid circuits, from the pressure generation source is maintained at all times during the antiskid operation period, in which the fluid pressure is intermittently increased and decreased, i.e. releasing and repressurization phases of the antiskid braking operation.

The above principle has been reduced to a cost-effective practical device by adopting a design so that a simple flow switching means is operated with one common pump to control the supply of brake fluid to the wheel cylinders. Therefore, when one flow valve is in the antiskid operation mode and the other flow valve is not in the antiskid operation mode (non-antiskid mode), the brake fluid, from the wheel cylinder disposed in the line in the antiskid mode and flowing into the reservoir through the flow valve and the open n/c valve, is circulated to each of the flow valves by one common pump. Here, in the flow valve disposed in the line in the antiskid mode, a spool in the flow valve is moved to close off the communication between the discharge fluid circuit of the pump and the fluid pressure generation source (shortened to pressure source); while in the flow valve disposed in the line in the non-antiskid mode, a spool in the flow valve is in the stationary position, and the flow of brake fluid into the flow valve from the discharge fluid circuit of the pump is shut off by the flow switching means. Therefore, there is no transmission of pressure pulsations to the pressure source through either flow valve. It follows that one common pump in one brakeline can be used to apply antiskid control on either one or more wheels without generating the unpleasant pedal kickbacks and thus resulting in a pleasant pedal feel.

DETAILED DESCRIPTION OF THE PREFERRED EMBODIMENTS

Figure 1:
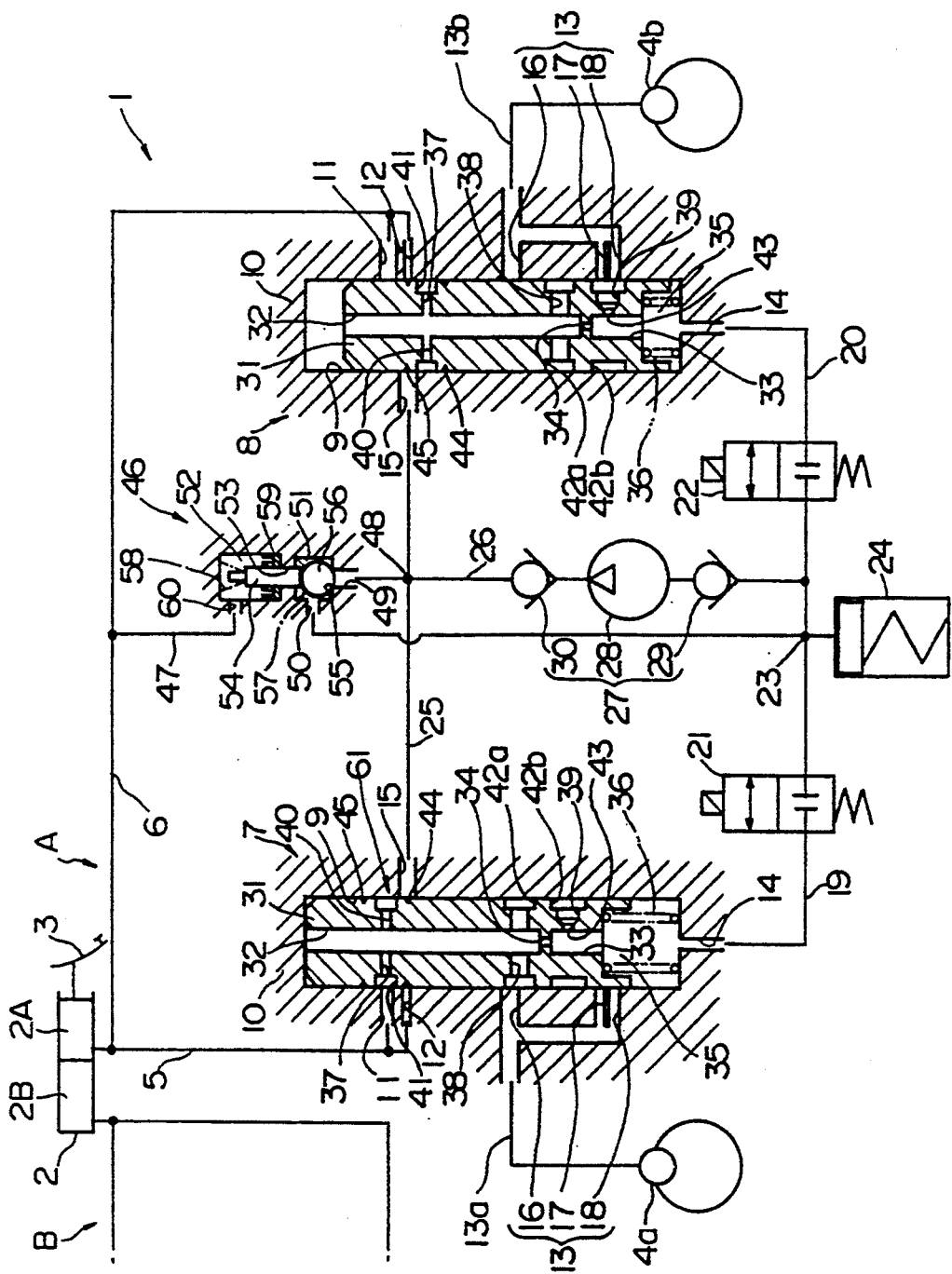
FIG. 1 is a schematic drawing to show a first embodiment of the present invention of brake fluid pressure control apparatus.

A first embodiment of the fluid pressure control apparatus of the present invention will be explained with reference to FIG. 1. In the following descriptions, the phrases concerning "top", "bottom", "up" and "down" refer to the direction of motions or actions with respect to the vertical direction in the drawings as shown.

In FIG. 1, the reference numeral 1 refers to the fluid pressure control apparatus for antiskid control purposes. A brake pedal 3 has an in-tandem type master cylinder 2 having two pressure sources 2A, 2B in series which generate a fluid pressure in accordance with the degree of pressing of the brake pedal 3. The pressure sources 2A, 2B are connected respectively to each of the two fluid pressure control circuits A, B which are in a X line arrangement.

In this case, the configuration of the control devices in the B circuit of the apparatus is the same as that in the fluid circuit A, therefore, explanations are provided only for the circuit A.

The fluid pressure control circuit A (shortened to fluid circuit A) is further divided into two separate front and rear circuits, each of which connects to a wheel cylinder 4a for the front wheel and a wheel cylinder 4b for the rear wheel, respectively.

The fluid circuit A is divided into two fluid passages 5 and 6 from the pressure source 2A, of the master cylinder 2. In each of the fluid passages 5, 6, a flow valve 7 or 8 is provided respectively. Each of the flow valves is provided with a casing 10 having a hollow cylinder section 9 which extends in the vertical direction, and is provided with a plurality of ports on the outside section thereof.

The ports comprise: a first port (communicating to the pressure source) 11; a second port (communicating to the pressure source) 12; a third port (communicating to the wheel cylinder) 13; a fourth port (communicating to the reservoir) 14; and a fifth port (communicating to the pump) 15, The first port 11 communicates with the fluid pressure source 2A via the fluid passages 5, 6, and is disposed perpendicular to the axis of the cylinder section 9 at a specified position. The second port 12 is disposed at a specified position below the first port 11 and parallel therewith, and is communicated with the first port 11 at the outside of the cylinder section 9. The third port 13 is disposed a specified distance below the second port 12, and communicates with the respective wheel cylinder 4a, 4b via respective passages 13a, 13b. The fourth port 14 is disposed at the lower part of the cylinder section 9 extending in the direction of the cylinder section 9. The axis of the fifth port 15 lies on a same plane as that of the second port 12. The fifth port 15 is disposed a given distance below and offset from the first port 11.

The third port 13 comprises an upper port 16, a middle port 17 and a lower port 18.

The upper port 16 is disposed a given distance below the first port 11 and in parallel therewith. The middle port 17 is disposed a given distance below the upper port 16 and in parallel therewith, and is communicated with the upper port 16 at the outside of the cylinder section 9. The lower port 18 is disposed a given distance below the middle port 17 and in parallel therewith, and is communicated with the upper port 16 and the middle port 17 at the outside of the cylinder section 9.

The fourth port 14 of each of the flow valves 7, 8 is connected to the passages 19, 20 which are provided with normally-closed (shortened to n/c) electromagnetic (shortened to em) valves 21, 22, respectively. The passages 19, 20 meet at a junction point 23. To the junction point 23 is attached a variable volume reservoir 24. The fifth port 15 of each of the flow valves 7, 8 is joined with each other on the fluid passage 25. The fluid passage 26 communicates with the fluid passage 20 at a junction disposed on the fluid passage 20 between the reservoir 24 and the n/c em valve 22, and the fluid passage 26 is communicated with the fluid passage 25 via a pump 27 disposed therein.

The pump 27 comprises a pumping body 28 which provides a fluid charge/discharge function, an intake valve 29 provided between the reservoir 24 and the pumping body 28, and a discharge valve 30 between the pumping body 28 and the fluid passage 25, and is designed so as to intake the brake fluid from the reservoir 24 circuit and discharge it to the fluid passage 25.

A cylindrical spool 31 is disposed in each of the flow valves 7, 8 so as to be freely movable vertically on the inside of the cylinder section 9 of the casing 10. The spool 31 is provided with an upper hole 32, along its axis, of a specific diameter continuing from the top section to a specified middle section thereof. The spool 31 is also provided with a lower hole 33, from the lower section to a specified middle section, which is communicated with the forth port 14 at all times. The axis of the lower hole 33 lies on a same plane as that of the hole 32 and has the same diameter as the upper hole 32. The upper hole 32 and the lower hole 33 are communicated with each other through a small diameter hole 34 of a specific small diameter. The lower end opening section 35 of the lower hole 33 has a diameter which is slightly larger than the other diameters. The upper end of a spring-loaded biasing spring 36 inserted in the opening section 35 biases (forces) the spool 31 upwards with a specific pressure.

The spool 31 is also provided with a first hole 37, a second hole 38, a third hole 39 and a fourth hole 40 all of which are oriented perpendicularly to the upper hole 32 and the lower hole 33.

The first hole 37 is disposed a given distance below the upper tip of the spool 31. When the spool 31 is in the stationary position by being pressed against the upper tip of cylinder section 9 (the condition depicted by the flow valve 7 in FIG. 1, which depicts the non-antiskid mode) by the upward force of the biasing spring 36, the upper hole 32 is communicated with the first port 11. During the antiskid operation mode (shown by the flow valve 8 in FIG. 1, which depicts repressurization phase of the antiskid operation), the pressure differential generated at the top and the bottom sections of the spool 31 causes the spool 31 to move to the operating position, thereby the communication between the upper hole 32 with the first port 11 and the second port 12 is shut off at the first hole 37.

The second hole 38 is disposed a given distance below the first hole 37. The second hole 38 communicates the upper hole 32 with the upper port 16 of the third port 13 when the spool 31 is in the stationary position mentioned above. The second hole 38 shuts off the upper hole 32 from the upper port 16 when the spool 31 is in the operating position mentioned above.

The third hole 39 is disposed a given distance below the second hole 38. The third hole 39 shuts off the lower hole 33 from the middle port 17 and the lower port 18 of the third port 13 when the spool 31 is in the stationary position mentioned above. The third hole 39 communicates the lower hole 33 with the middle port 17 and the lower port 18 of the third port 13 when the spool 31 is in the operating position mentioned above.

The fourth hole 40 is disposed opposite to the first hole 37. The fourth hole 40 shuts off the upper hole 32 from the fifth port 15 when the spool 31 is in the stationary position. The fourth hole 40 communicates the upper hole 32 with the fifth port 15 when the spool 31 is in the operating position, and restricts the communication (minimal communication or shutting off) when the spool 31 is moved down further.

For convenience, the first hole 37 and the fourth hole 40 have been separately described, but because the spool 31 is provided with a groove 41 on the outer periphery, there is no difference between the two. Therefore, it is permissible to provide only one of the first hole 37 or the fourth hole 40. The second hole 38 and the third hole 39 are also provided with the grooves 42a, 42b on the outer periphery of the spool 31. The third hole 39 has a small hole 43, of a slightly larger diameter than the small diameter hole 34 disposed to communicate with the lower hole 33. There is a small groove 44 disposed a given distance below the first hole 37 on the outer periphery of the spool 31 for providing a minimal communication between the second port 12 and the fifth port 15 when the spool 31 is in the stationary position. There is a small groove 45 disposed a given distance above the first hole 37 provided on the outer periphery of the spool 31 for providing a minimal communication between the second port 12 and the fifth port 15 when the spool 31 is again pressurized for the antiskid operation mode (the repressurization phase shown in FIG. 1). The small grooves 44, 45 serve as the extremely small orifice for the purpose of providing a constant communication within the brake fluid circuit or a fail safe step for a (pressure) regulating valve 46 which will be described later; they are not the large orifices for providing such function as returning the excess discharge fluid from the pump 27 to the pressure source 2A during the antiskid operation mode.

A fluid passage 47 having the regulating valve 46 is provided between the junction point 23 and the fluid passage 6. The regulating valve 46 has a pump communicating chamber 51, and on the upper side of the pump communicating chamber 51, there is a master cylinder communicating chamber 52 disposed in parallel with and separately from the pump communicating chamber 51. The pump communicating chamber 51 is provided with a pump discharge connecting port 49 which communicates with the junction point 48 between the fluid passage 25 and the fluid passage 26, and with a pump intake connecting port 50 which connects with the intake side of the pump 27 via fluid passage 47. The pump communicating chamber 51 and the master cylinder communicating chamber 52 are communicated through a through hole 53, in which is inserted a piston 54 which is free to move vertically within a fixed distance.

The pump communicating chamber 51 is provided with a valve body 56. The valve body 56 shuts off the pump discharge connecting port 49 when it is seated in the valve seat 55 at the boundary section between the pump discharge connecting port 49 and the pump communicating chamber 51. When the brake fluid pressure from the pump discharge connecting port 49 becomes high, the valve member 56 moves upwards to enable the brake fluid to flow into the intake side of the pump 27 via the pump intake connecting port 50 of the regulating valve 46.

Opposite to the pump discharge connecting port 49 of the valve member 56, there is a spring 57 which forces the valve member 56 downwards to close the valve seat 55, and a spring 58 pushes the bottom end of the piston 54 to contact valve member 56. The valve opening pressure for the valve member 56 is set at a value higher than the fluid pressure of the fluid pressure generating source 2A by the amount of the biasing pressure of the springs 57, 58 exerted on the piston 54 through the fluid passage 6.

A cup packing 59 is inserted into the lower section of the master cylinder communicating chamber 52, and above the cup packing 59 is disposed a master cylinder connecting port 60 which is connected, via the fluid passage 47, to the fluid passage 6 which leads to the pressure source 2A. The cup packing 59 shuts off communication between the master cylinder communicating chamber 52 and the pump communicating chamber 51, when the fluid pressure in the communicating chamber 52 is higher than that in the communicating chamber 51. When the fluid pressure in the communicating chamber 52 is lower than that in the communicating chamber 51, the master cylinder communicating chamber 52 and the pump communicating chamber 51 are communicated through the spacing between the through hole 53 and the piston 54. The regulating valve 46 serves as a pressure relief mechanism.

Next, the operation of the fluid pressure control apparatus 1 of a first embodiment of the above configuration will be explained in the order of the action steps.

First, when the system is not in the antiskid operation mode, the spool 31 of the flow valves 7, 8 is disposed so as to communicate the fluid pressure source 2A with the wheel cylinders 4a, 4b via the first port 11, the first hole 37, the upper hole 32, the second hole 38 and the upper port 16 of the third port 13. In this condition, the system allows normal braking operation of pressurizing the wheel cylinders 4a, 4b in accordance with the degree of pressing of the brake pedal. The third hole 39 and the fourth hole 40 of the flow valves 7, 8 are shut off from any of the outer peripheral ports of the cylinder section 9 (refer to the condition of the flow valve 7 in FIG. 1, which is the stationary position of the spool 31).

When one of the wheel cylinders, for example, the wheel cylinder 4b enters the pressure reduction phase in the antiskid operation mode, as a result of opening the n/c em valve 22, the brake fluid, existing in the space surrounded by the lower hole 33 and the lower section of the casing 10, flows into the reservoir 24. As a result, a pressure differential is generated between the upper and the lower sections of the spool 31 (the fluid pressure at the upper hole 32 and that at the lower hole 33), and the spool 31 moves downward from the stationary position to the operating position. In this position, the spool 31 shuts off the communication of the first hole 37 with the first port 11 and the second port 12, and at the same time, makes the wheel cylinder 4b to communicate with the reservoir 24 via the middle port 17 and the lower port 18 of the third port 13, the third hole 39 and the lower hole 33. This results in the brake fluid in the wheel cylinder 4b to flow into the reservoir 24, thereby reducing the brake fluid pressure in the wheel cylinder 4b.

In the antiskid operation mode, the pump 27 is always in operation. During the pressure reduction phase, the fifth port 15 of the casing 10 of the flow valve 8 is shut off from the fourth hole 40 of the spool 31, and the brake fluid in the reservoir 24 circulated by the pump 27 is returned, via the regulating valve 46, to the reservoir 24 circuit when the discharge pressure exceeds a specific value. The repressurizing phase of the antiskid operation is performed by closing the n/c em valve 22 in FIG. 1, the wheel cylinder 4b is pressurized by an approximately constant flow rate in the flow valve 8 obtained by the flow through the fourth hole 40, the upper hole 32, the small diameter hole 34, lower hole 33 the third hole 39 and via the middle port 17 and the lower port 18 of the third port 13.

The brake fluid discharged by the pump 27 is flowed into the fifth port 15 of the flow valve 7 in the wheel cylinder 4a circuit which is in the non-antiskid mode.

In this case, the flow of the brake fluid into the flow valve 7 in the non-antiskid mode is prevented by the spool 31 which is in the stationary position which shuts off the communication between the fourth hole 40 and the fifth port 15 which constitutes the flow switching means 61 (consisting of the fourth hole 40 and the fifth port 15). It follows that the wheel cylinder 4a circuit is isolated from the pulsating actions of reducing and increasing (repressurizing) pressures of the brake fluid generated by the pump, thus preventing the transmission of the pressure pulsations back to the pressure source 2A through the first port 11.

In the flow valve 8 which is in the antiskid operation mode, the communication of the first hole 37 with the first port 11 and the second port 12 is shut off by the spool 31 so as not to transmit the discharge pressure by the pump 27 directly to the pressure source 2A, therefore, it follows that the fluid passage 6 is isolated and there is no transmission of the pressure pulsations by the pump 27 to the pressure source 2A through the first port 11.

Therefore, the unpleasant pedal kickbacks are prevented.

In the case of changing frictional conditions between the tires and the road, a vehicle may encounter a high friction condition after commencing the antiskid operation mode in a low friction condition. If the pressurization is required even after the fluid in the reservoir 24 has been exhausted, the pressure difference between the upper hole 32 and the lower hole 33 of the spool 31 becomes small under such a condition, and the spool 31 rises due to the biasing force of the spring 36, thereby communicating the first hole 37 with the second port 12, and enabling to increase the pressure from the pressure source 2A.

As described above, the antiskid braking system of the present invention is cost effective because the flow switching means 61 is constructed such that, during the non-antiskid mode, i.e., when the spool 31 is in the stationary position, the flow of the brake fluid from the discharge fluid circuit of the pump 27 into the corresponding flow valves 7, 8 is prevented by shutting off the communication path; and during the antiskid operation mode, i.e., when the spool 31 is operating, the fifth port 15 of the casing 10 in the flow valves 7, 8 and the opposing fourth hole 40 of the spool 31 are positioned so as to control the communication between the pump 27 and the flow valves 7, 8 by maintaining a flow rate in accordance with the position of the spool 31. This position is a function of the pressure differential generated at the ends of the small diameter hole 34 by the fluid flow.

Further, when the discharge pressure at the pump 27 becomes higher than the pressure at the pressure source 2A by a specific value, the valve member 56 of the regulating valve 46 moves against the biasing force of the spring 57 and against the pressure of the piston 54, thereby relieving the excess pressure at the discharge fluid circuit of the pump 27 to the reservoir 24 circuit. Therefore, it becomes possible to prevent unnecessary rise in pressure in the discharge fluid circuit of the pump 27, and also to control the pressure level of the brake fluid being returned to the flow valves 7, 8 at a specific level higher than the pressure at the pressure source 2 A.

Further, if the pressure at the pressure source 2A drops (as would happen when the brake pedal is released), the pressure in the master cylinder communicating chamber 52 of the regulating valve 46 becomes lower than that in the pump communicating chamber 51 of the regulating valve 46, thus enabling the brake fluid present in the reservoir 24 and in the intake side of the pump 27 to return quickly to the pressure generating source 2A through the cup packing 59. Therefore the brake fluid in the circuit of the wheel cylinder 4a, 4b operating in the antiskid operation mode to be returned to the pressure source 2A circuit. The result is that the pressure in the fluid circuit of the wheel cylinder 4a, 4b can follow the pressure drop in the pressure source 2A circuit, thus enabling the brake fluid in the reservoir 24 to return to the pressure generating source 2A, and leaving no brake fluid in the reservoir 24.

Next, a second embodiment of the present invention will be explained with reference to FIG. 2. In this embodiment, the flow switching means is different from the first embodiment. Therefore, the explanation is directed primarily at the difference, and the sections which are the same as in the first embodiment are omitted from the explanation.

In the second embodiment, one each of the n/c valves (n/c switching valves) 62, 63 is provided in the fluid circuit between the junction point 48 and the flow valves 7, 8. The n/c valves 62, 63 open or close by monitoring the fluid pressures in the fluid passages 5, 6 which exist between the pressure source 2A and the flow valves 7, 8 (i.e. the fluid pressure in the pressure source 2A), and the fluid pressure in the fluid passages 13a, 13b which exist between the wheel cylinders 4a, 4b and the flow valves 7, 8 (i.e. the fluid pressure in the wheel cylinder 4a, 4b).

The flow valves 7, 8 do not have a second port, and the fifth port 15 is disposed so that the axis lies on the same plane as that of the first port 11. The diameter of the fifth port 15 is made larger than that of the first port 11 by a specific amount. This configuration results in the first port 11 communicating with the first hole 37, and the fifth port 15 with the fourth hole 40, when the spool 31 is in the stationary position; when the spool 31 is in the operating position, the communication between the first port 11 and the first hole 37 is shut off, and the communication between the fifth port 15 and the fourth hole 40 is restricted (minimal communication or shutting off).

Figure 2:
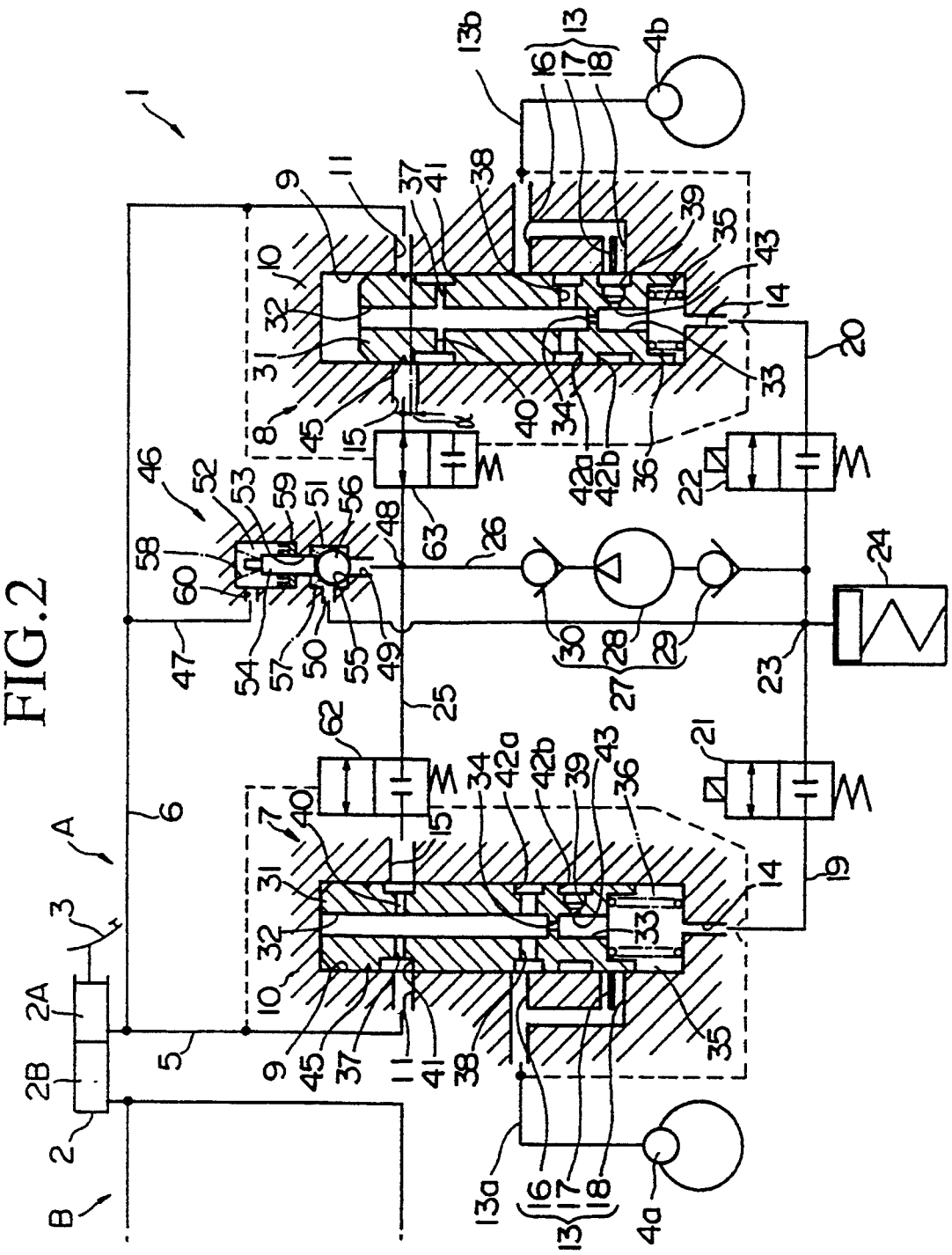
FIG. 2 is a schematic drawing to show a second embodiment of the present invention of brake fluid pressure control apparatus.

And, during the repressurization phase of the antiskid operation, as represented by the flow valve 8 in FIG. 2, the fifth port 15 is communicated with the fourth hole 40 earlier than the first port 11, by an amount equal to the difference in the radii of the fifth port 15 and the first port 11 (shown by a in FIG. 2). The wheel cylinder 4b is repressurized at a roughly constant flow rate through the communicated portion.

Further, a small groove 45 is provided on the spool 31 so as to communicate the first port 11 with the fifth port 15 when the spool 31 is in the antiskid operation mode. However, this small groove 45 is not a large orifice which can handle the discharged fluid from the pump 27, in the antiskid operation mode, to the pressure source 2A.

According to the construction of the brake fluid pressure control apparatus in the second embodiment, the n/c valves 62, 63 are opened, during the antiskid operation mode, only when n/c em valves 21, 22 are opened, which makes the pressure in the wheel cylinder 4a, 4b lower by a specific amount than that in the pressure source 2A. At other times, the n/c valves 62, 63 are in the closed state.

Therefore, as in the first embodiment above, even when one wheel cylinder 4b is in the antiskid operation mode (as in the repressurization phase shown FIG. 2), if the other wheel cylinder 4a is in the non-antiskid mode, the pressure in the wheel cylinder 4a does not become lower than that in the pressure source 2A. Therefore, the n/c valve 62 in the non-antiskid mode does not open. It follows that the effects of the pressure pulsations of the pump 27 are not transmitted to the pressure source 2A.

Further, even in the fluid circuit which is in the antiskid operation mode, the n/c valve 63 is open, but the spool 31 of the flow valve 8 is in the operating position, thereby shutting off the first port 11 from the first hole 37, thus preventing the discharged fluid from the pump 27 from being returned to the pressure source 2A circuit through the flow valve 8. Even in the circuit in the antiskid operation mode, there is no transmission of the pressure pulsations by the pump 27 to the pressure source 2A.

It follows, therefore, that there will be no generation of unpleasant pedal kickbacks.

As described above, the n/c valves 62, 63 are set to open when the fluid pressure in the wheel cylinder 4a, 4b becomes less than that in the pressure source 2A so that the brake fluid can flow into the flow valves 7, 8 from the pump 27 circuit, regardless of the movement of the spool 31.

When this second embodiment is applied in an X line configuration, because a same type of flow valves 7, 8 can be used in the two circuits, and in view of the fact that the front wheels are more susceptible to wheel locking owing to the presence of the proportioning valve in the rear brake circuit, it is possible to provide n/c valve 62 or 63 only on the rear wheels. The flow valves can be different from those shown in FIGS. 1 and 2, and this applies equally to the first embodiment.

Next, a third embodiment will be explained with reference to FIG. 3. The third embodiment is different only in the aspect of flow switching means from the above second embodiment, therefore, the description will center around this difference, and those sections which are the same as in the first and second embodiments are designated by the same reference number, and their explanations are omitted.

In the third embodiment, there is provided a n/c valves 64, 65 in each circuit between the junction point 48 and the flow valves 7, 8. The n/c valves 64, 65 monitor the fluid pressures in the pump 27 circuit of the fluid passage 25 and that in the circuit between the wheel cylinders 4a, 4b and the flow valves 7, 8 (i.e. the fluid pressure in the wheel cylinders 4a, 4b), and operate the n/c valves 64, 65 accordingly.

According to the fluid pressure control apparatus of the third embodiment, the n/c em valves 21, 22 are opened when in the antiskid operation mode, and the n/c valves 64, 65 are opened when the fluid pressure in the wheel cylinder 4a, 4b is lowered by a specific value, and the fluid pressure in the fluid passage 25 is increased by a specific value. At other times, the n/c valves 64, 65 are closed.

Figure 3:
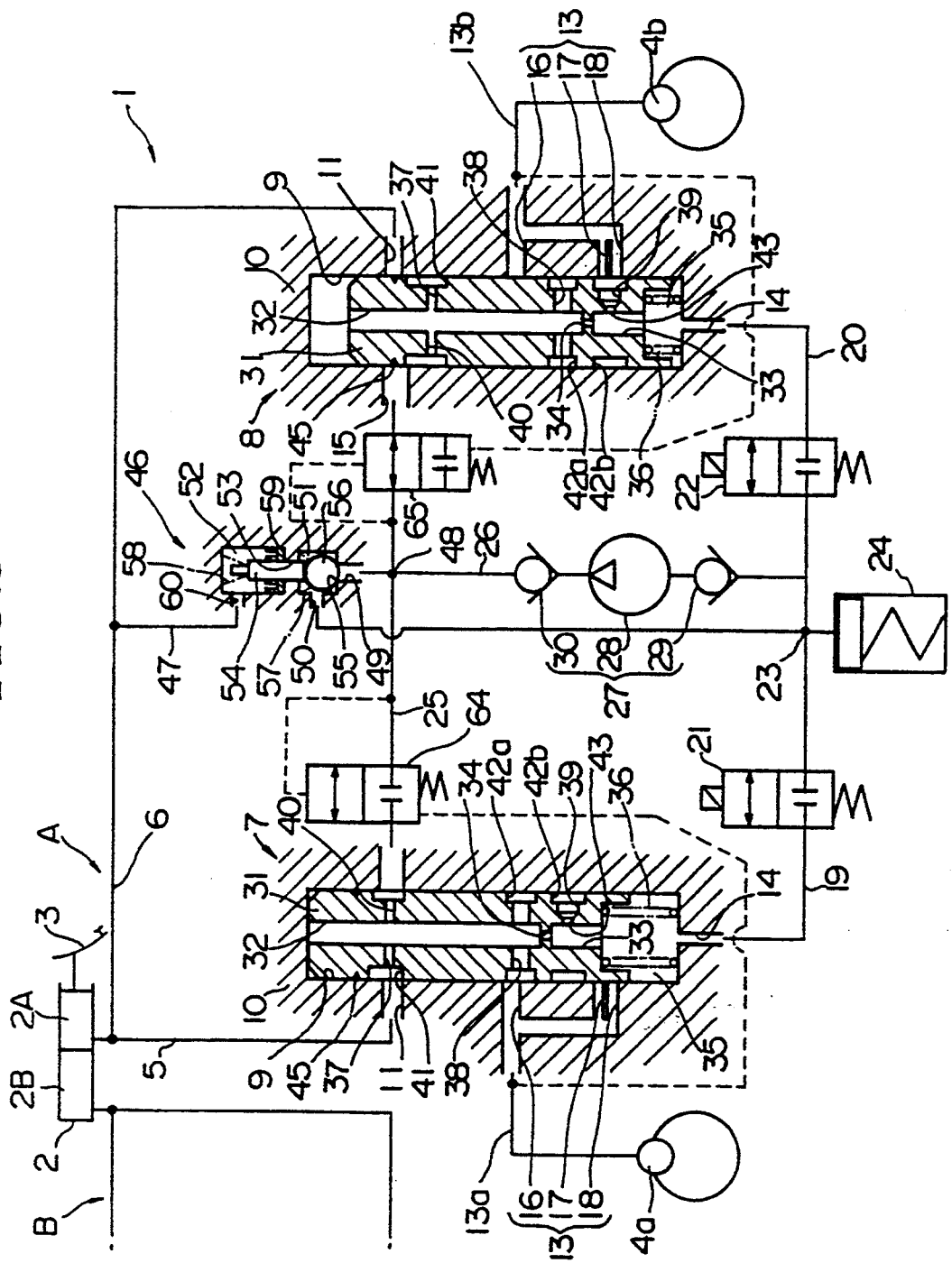
FIG. 3 is a schematic drawing to show a third embodiment of the present invention of brake fluid pressure control apparatus.

Therefore, as in the second embodiment, even if one of the wheel cylinder 4b is in the antiskid operation mode (as in the repressurization phase shown by the flow valve 8 in FIG. 3), if the other wheel cylinder 4a is in the non-antiskid mode, the n/c valve 64 disposed in the non-antiskid mode circuit will not be opened. Further, as in the second embodiment, even in the antiskid mode circuit, although the n/c valve 65 is open, the communication between the first port 11 and the first hole 37 is shut off, and the pressure pulsations from the pump 27 are not transmitted to the pressure source 2A circuit.

Figure 4:
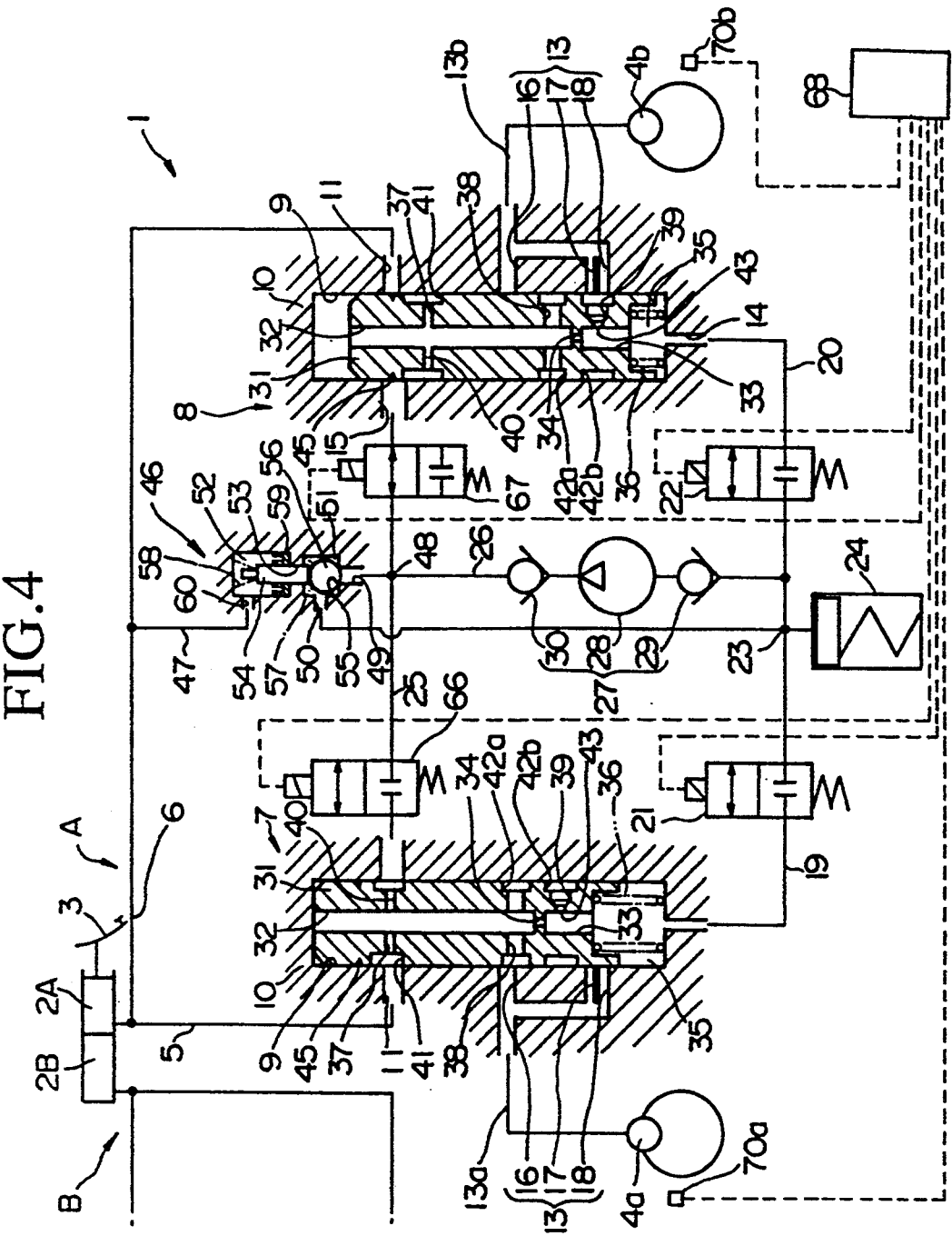
FIG. 4 is a schematic drawing to show a fourth embodiment of the present invention of brake fluid pressure control apparatus.

Next, a fourth embodiment will be explained with reference to FIG. 4. The fourth embodiment is different only in the aspect of flow switching means from the above second and third embodiments, therefore, the description will center around this difference, and those sections which are the same as in the second and third embodiments are designated by the same reference number, and their explanations are omitted.

In the fourth embodiment, there is provided a n/c em valves (switching n/c em valves) 66, 67 in each circuit between the junction point 48 and the flow valves 7, 8. The em valves 66, 67 are connected to and operated by a controller 68 which opens and closes the n/c em valves 21, 22 in accordance with the signals from the controller 68. This controller 68 is connected to speed sensors 70a, 70b to detect the wheel rotation speed, and thereby to detect wheel locking and perform antiskid operations.

It should be noted that the controller 68, sensors 70a, 70b are also provided on other embodiments.

The controller 68 makes a decision of initiating the antiskid operation mode for each wheel independently, or at least for those wheels sharing a common pump.

According to the fourth embodiment, when the antiskid operation is initiated, the n/c em valves 21, 22 are opened and at the same time, the n/c em valves 64, 65 are opened. At other times, the valves 64, 65 remain closed. Further, in the antiskid operation mode, the n/c em valves 21, 22 are closed or opened depending on the operating conditions of the wheels, but the n/c em valves 66, 67 are maintained in the open position once the antiskid operation mode is commenced.

Therefore, as in the second and third embodiments, even if one of the wheel cylinder 4b is in the antiskid operation mode (as in the repressurization phase shown by the cylinder 8 in FIG. 3), if the other wheel cylinder 4a is in the non-antiskid mode, the n/c valve 66 disposed in the non-antiskid mode circuit will not be opened. Further, as in the second embodiment, even in the antiskid mode circuit, although the n/c valve 67 is open, the communication between the first port 11 and the first hole 37 is shut off, and the pressure pulsations from the pump 27 are not transmitted to the pressure source 2A circuit.

As described above, the controller 68 makes it possible to let the brake fluid flow from the discharge fluid circuit into the flow valves 7, 8 by opening the n/c em valves 66, 67 immediately upon entering the antiskid operation mode, i.e. opening of the n/c em valves 21, 22.

Figure 5:
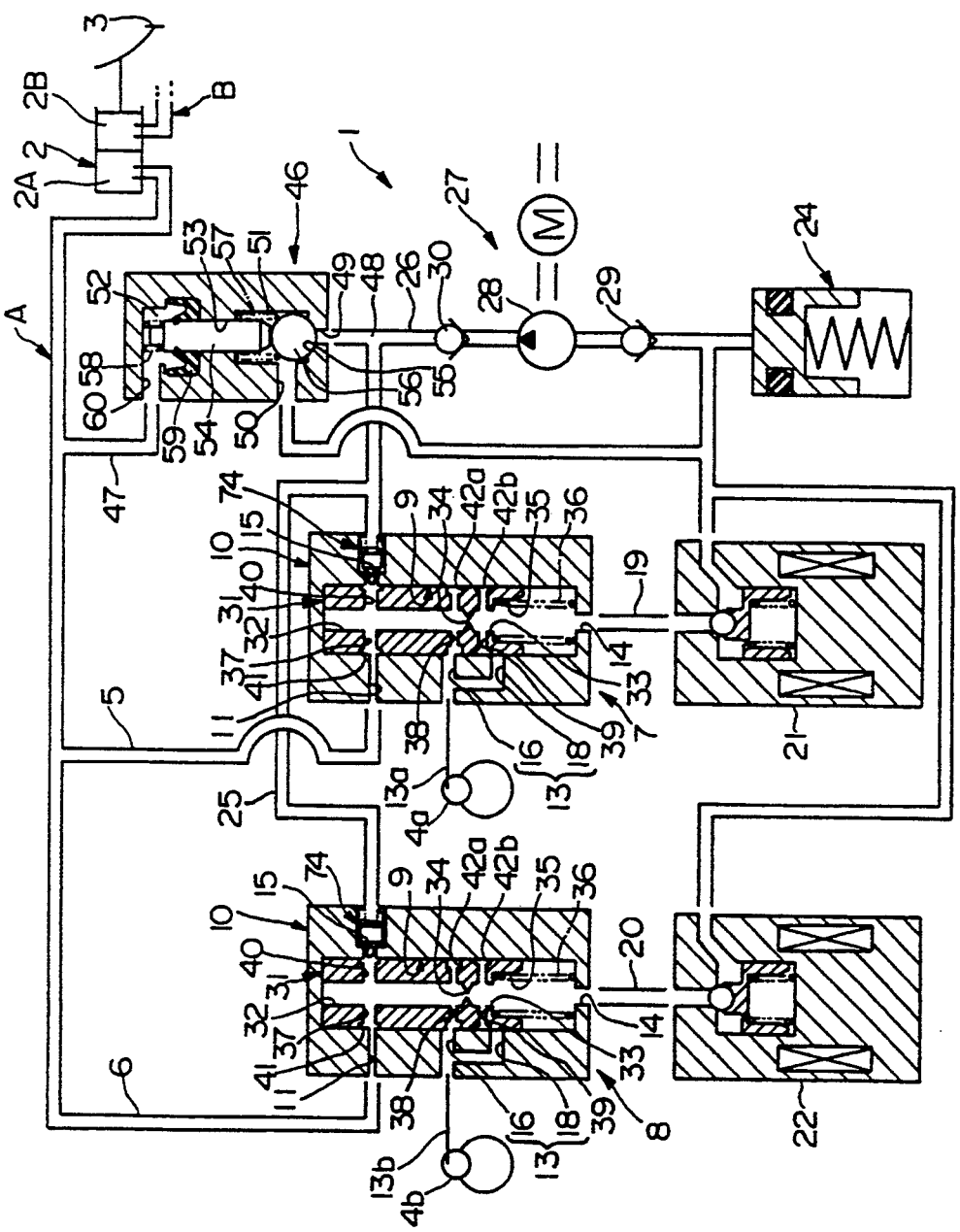
FIG. 5 is a schematic drawing to show a fifth embodiment of the present invention of brake fluid pressure control apparatus.

Next, a fifth embodiment will be explained with reference to FIGS. 5 and 6. The fifth embodiment is different only in the aspect of flow switching means from the above second embodiment, therefore, the description will center around this difference, and those sections which are the same as in the second embodiment are designated by the same reference number, and their explanations are omitted.

The third port 13 comprises an upper port 16 disposed a specific distance below the first port 11, and a lower port 18 disposed a specific distance below the upper port 16.

Each of the flow valves 7, 8 has no second port, as in the second embodiment, and the fifth port 15 is disposed coaxially with the first port 11. The diameter of the fifth port 15 is larger than that of the first port 11 by a specific value. Therefore, when the spool 31 is in the stationary position, the first port 11 communicates with the first hole 37, and the fifth port 15 communicates with the fourth hole 40. And, when the spool 31 is in the operating position, the communication between the first port 11 and the first hole 37 is shut off, and the communication between the fifth port 15 and the fourth hole 40 is restricted (minimal communication or shut off).

Figure 6:
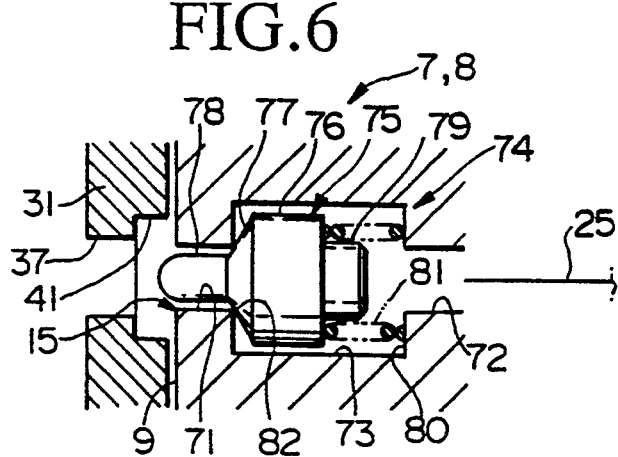
FIG. 6 is a cross sectional view of the control valve used in the fifth embodiment of the present invention of brake fluid pressure control apparatus.

The fifth port 15 of each of the flow valves 7, 8 comprises: as shown in FIG. 6, a small diameter hole 71 disposed on the opening to the cylinder section 9; a small diameter hole section 72 disposed on the opening to the fluid passage 25; and a large diameter hole section 73 disposed coaxially with and having a larger diameter than the small diameter hole sections 71, 72 by a specific amount. The small diameter hole sections 71, 72 are larger than the first port 11 by a specific amount. The small diameter hole section 72 can be the fluid passage 25 itself. The fifth port 15 is provided with a control valve 74 having a valve component 75. The valve component 75 comprises an axis part 76, a taper part 77, a round tipped protrusion part 78 and an engaging part 79. The axis part 76 has a smaller diameter than the large diameter section 73 by a certain amount. The taper part 77 is disposed on the spool 31 side of the axis part 76, and the protrusion part 78 is disposed on the spool 31 side of the taper part 77. The diameter of the protrusion part 78 is smaller than that of the small diameter hole section 71 by a specific amount. The engaging part 79, the diameter of which is smaller than that of the axis part 76, is disposed facing the small diameter hole section 72.

Between the valve component 75 and the stepped section 80 at the boundary of the small diameter hole section 72 and the large diameter hole section 73 is disposed a control spring 81, whose inner diameter is engaged with the engaging part 79, and having a certain biasing force.

When the spool 31 is in the stationary position, the valve component 75 is under a compressive biasing force of the spring 81, thus placing the taper part 77 against the seating part 82 (which constitutes a part of the control valve 74) of the small diameter hole section 71, thereby shutting off the fifth port 15 as well as protruding the protrusion part 78 into the groove 41 or the spool 31 (as shown in FIG. 6).

When the spool 31 is in the operating position, and the protrusion part rides on the outer periphery of the spool 31, the valve component moves in the opposite direction to the cylinder section 9 against the biasing force of the control spring 81, thus releasing the closure by the taper part 77 at the seating part 82, thereby opening the fifth port 15.

The operation of the fifth embodiment when one of the wheel cylinders, for example, 4a is in the antiskid operation mode will be explained below.

When only the front wheel cylinder 4a is in the antiskid operation mode, the n/c em valve 21 opens and this generates a fluid pressure differential at the top and bottom sections of the spool 31, which induces the spool 31 to move downward. The spool 31 shuts off the communication between the first port 11 and the first hole 37, and at the same time, communicating the wheel cylinder 4a with the reservoir 24 via the lower port 18 and the third port 13, thus flowing the brake fluid in the wheel cylinder 4a into the reservoir 24 to lower the fluid pressure. In this case, the valve component 75 of the control valve 74 moves against the biasing force of the spring 81 as a result of the protrusion part 78 riding on the outer periphery of the spool 31. This action opens the fifth port 15 enabling the brake fluid to flow into the flow valve 7 from the pump 27.

In the antiskid operation mode, the pump 27 is constantly in operation. During the reduced pressure phase mentioned above, the discharged fluid from the pump 27 is led into the fifth port 15 of the flow valve 7 while maintaining the fluid pressure at a specific value higher than that in the pressure source 2A circuit by the action of the regulating valve 46. In the condition that the fifth port 15 and the fourth hole 40 are communicated in accordance with the position of the spool 31, the brake fluid flows into the reservoir 24 via open fifth port 15, the fourth hole 40 are communicated with the fifth port 15 in accordance with the position of the spool 31, the upper hole 32, the small diameter hole 34, the lower hole 33 and the third port 13. Further in this case, the spool 31 moves up or down in accordance with the pressure differential in the spool 31 determined by the small diameter hole 34, and the brake fluid flows into the reservoir 24 via the small diameter hole 34 at an approximately constant flow rate.

During the repressurizing phase of the antiskid operation, the n/c em valve 21 is closed. Accordingly, the brake fluid discharged from the pump 27 flows to the wheel cylinder 4a via open fifth port 15 and the fourth hole connected with the fifth port 15, the upper hole 32, the small diameter hole 34, the lower hole 33, the third hole 39, and the lower port 18, thereby repressurizing the wheel cylinder 4a. This repressurization is performed by the brake fluid flowing through the small diameter hole 34 at a constant rate in accordance with the up and down movement of the spool 31 caused by the pressure differential at the top and bottom sections of the spool 31.

The brake fluid discharged from the pump 27 is flowed into the fifth port 15 of flow valve 8 in the rear wheel cylinder 4b circuit which is in the non-antiskid mode.

However, the spool 31 in the flow valve 8 which is in the non-antiskid mode is in the stationary position, and therefore, the valve component 75 of the control valve 74 disposed in the fifth port 15 is not pressing back, and is seated in the seating part 82 by the biasing force of the control spring 81, and the brake fluid does not flow into the flow valve 8. It follows therefore that the pressure pulsations are not transmitted to the pressure source 2A circuit.

Therefore, even when only one of the wheels is in the antiskid operation mode, unpleasant pedal kickbacks are prevented. Furthermore, this effect is achieved by a relatively simple construction of having a seating part 82 in the fifth port 15, together with a valve component 75 and the control spring 81.

Figure 7:
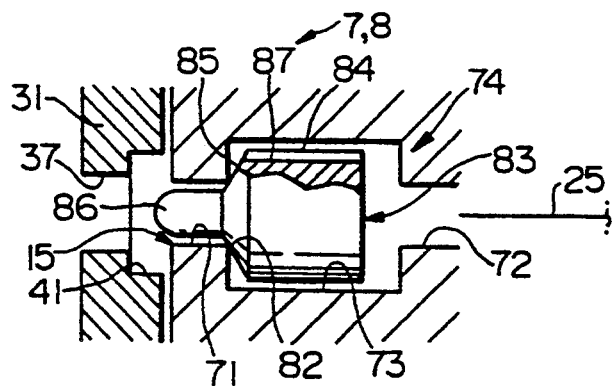
FIG. 7 is a schematic drawing to show a sixth embodiment of the present invention of brake fluid pressure control apparatus.
Figure 8:
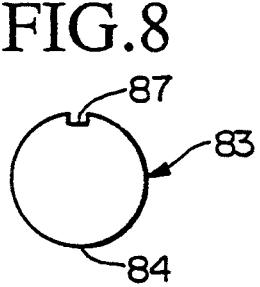
FIG. 8 is a view of the valve part of the control valve of the sixth embodiment seen from the right side in FIG. 7.
Figure 9:
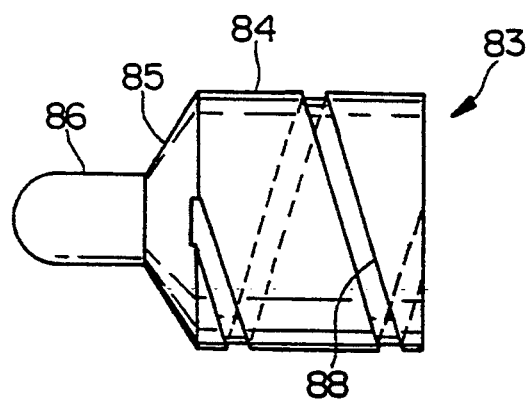
FIG. 9 is a front view of another example of the valve part of the control valve of the sixth embodiment.

Next, a sixth embodiment will be explained with reference to FIGS. 7 and 8. The sixth embodiment is different only in the aspect of altered control valve, and the explanation will be centered around this aspect.

The control valve 74 in this embodiment comprises a valve component 83 which comprises an axis part 84, a taper part 85 and a round-tipped protrusion part 86. The diameter of the axis part 84 is smaller than the large diameter hole section 73 by a specific amount. The taper part 85 is disposed on the spool 31 side of the axis part 84, and the protrusion part 86 is disposed on the spool 31 side of the taper part 85. The diameter of the protrusion part 86 is smaller than that of the small diameter hole section 71 by a specific amount.

The external periphery of the axis part 84 is provided with a groove part (pressure differential generation means) 87 of a specific flow area in the axial direction.

According to the control valve 74 of the sixth embodiment, if one of the control valves 7, 8 is in the non-antiskid mode, and the pump 27 discharges the brake fluid in the fifth port 15 circuit in each of the flow valves 7, 8, the discharged fluid flows through the groove part 87 of the valve component 83 provided on the fifth port 15 of the flow valves 7, 8 which is operating in the non-antiskid mode. By having the groove part 87 functioning as an orifice, a differential pressure is generated in the valve component 83 between the fluid entry and exit sides, which forces the taper part 85 of the valve component 83 to seat against the seating 82 to shut off the fifth port 15.

In this case, because the fluid pressure in the brake fluid discharged from the pump 27 by means of the regulating valve 46 has a slightly higher than that in the pressure source 2A, the valve component 83 is able to keep the fifth port 15 closed. Therefore, even when only one of the wheel cylinders is in the antiskid operation mode, unpleasant pedal kickbacks are prevented. Further, because the control valve 74 in the sixth embodiment does not require a control spring, the valve component 83 is sufficient, and because the spring is not required, it is possible to make the control valve compact.

To enter the antiskid operation mode, the protrusion part 86 of the valve component 83 rides on the moved spool 31, as in the fifth embodiment, thus overcoming the pressure differential, opening the fifth port 15 and placing the flow valves 7, 8 in the antiskid operation mode.

Further, in the sixth embodiment, orifices of various designs can function as the pressure difference generation means, for example, by providing a plurality of fine holes in the axis part 84 or forming a spiral shaped groove 88 connecting the entry and exit ends on the external periphery of the axis part 84 of the valve component 83. The spiral configuration has an advantage that it can be readily machined.

In the fifth and sixth embodiments presented above, the valve components 75, 83 were made of an integral body, however, the valve components are not restricted to such a configuration, and the component sections such as a protrusion part 78, 86 can be assembled separately.

In the above presentations, "shut off" includes cases in which the fluid may show slight leaks which would not impair the proper functioning of the apparatus.

The relief mechanisms shown in the first to the sixth embodiments have utilized the fluid pressure in the pressure source 2A circuit, however, the pressure source can also be obtained from the reservoir 24 circuit after the fluid pressure in the circuit has attained a constant value.

What is claimed is:

1. A fluid pressure control apparatus in a braking system having an antiskid control capability for use in an automotive vehicle, said apparatus comprising:
   (a) a fluid pressure generation source which generates a brake fluid pressure upon pressing of a brake pedal:
   (b) at least two wheel cylinders, which are provided for said fluid pressure generation source;
   (c) a reservoir, operatively shared between said at least two wheel cylinders, for holding discharged brake fluid from said at least two wheel cylinders;
   (d) a normally-closed valve, operatively connected to said reservoir, for each of said at least two wheel cylinders for controlling the communication between said reservoir and each of said at least two wheel cylinders;

(e) a pump operatively shared by said at least two wheel cylinders for withdrawing the brake fluid from said reservoir and discharging the brake fluid to one of said reservoir or a wheel cylinder;

(f) a flow valve provided for each of said at least two wheel cylinders, operatively connected to said fluid pressure generation source, to said pump and to one of said at least two normally-closed valves, for allowing the brake fluid to flow through in accordance with the actions of a spool which is disposed within said flow valve in response to a normally-closed valve;

(g) a controller which controls said at least two normally-closed valves in accordance with the rotational motion of wheels; and (h) flow switching means, disposed on each of said at least two flow valves, for controlling the flow of brake fluid from the discharge fluid circuit of said pump into said flow valve; wherein;

when said spool is in a stationary position for a normal braking operation, said normally-closed valve is closed, and said fluid pressure generation source is communicated with said wheel cylinder, and the flow of brake fluid from the discharge fluid circuit of said pump to said fluid pressure generation source via said flow valve is essentially shut off by said flow switching means; and when said spool is in an operating position and said normally-closed valve is open, the communication between said fluid pressure generation source and said wheel cylinder is essentially shut off; and the communication between said pressure generation source and the discharge fluid circuit of said pump is essentially shut off; while the communication between said reservoir and said wheel cylinder is open, when said spool is in said operating position and said normally-closed valve is closed, the brake fluid discharged from the pump is supplied to said wheel cylinder.

2. An apparatus as claimed in claim 1, wherein a pressure relief device is provided so as to allow an excess discharge fluid pressure from said pump to return to said reservoir.

3. An apparatus as claimed in claim 1, wherein said flow switching means is provided on each of said flow valves.

4. An apparatus as claimed in claim 1, wherein said flow valve comprises:

(a) a pressure generation source communicating port communicating with said pressure generation source;

(b) a wheel cylinder communicating port communicating with said wheel cylinder;

(c) a reservoir communicating port communicating with said reservoir;

(d) a pump communicating port communicating with said discharge side of said fluid circulating pump: and (e) a spool, disposed within said flow valve and is loaded by a biased spring, wherein (f) a plurality of holes provided on the outside of said spool for switching communications of various ports of said flow valve; wherein when said spool is biased on said stationary position and said normally-closed valve for each of said at least two wheel cylinders is closed, said plurality of holes communicate with pressure generation source communicating port with said wheel cylinder communicating port; and when said normally-closed valve for each of said at least two wheel cylinders is opened, said spool moves to said operating position in response to a pressure difference generated at both ends of said spool, said plurality of holes shut off the communication of said fluid pressure generation source communicating port with said wheel cylinder communicating port, and shut off the communication of said pressure generation source with said pump communicating port, and communicating said wheel cylinder communicating port with said reservoir communicating port; and when said normally-closed valve for each of said at least two wheel cylinders is closed, said spool remains substantially in said operating position, and said plurality of holes supply the brake fluid which is returned by said pump to said wheel cylinder at an approximately constant rate.

5. An apparatus as claimed in claim 4, wherein, said flow switching means is constructed by disposing said pump communicating port of at least one of said flow valves and an opposing hole of said plurality of holes of said spool so that when said spool is in said stationary position, the communication with each other is shut off and when said spool is in said operating position, the communication with each other is open or restricted.

6. An apparatus as claimed in claim 5, wherein said pump communicating port is closed by said spool in said stationary position, and said pressure generation source is communicated with a hole of said plurality of holes of said spool in said stationary position.

7. An apparatus as claimed in claim 6, wherein said spool is provided with a circumferential groove communicating with said hole, and when said spool is in said stationary position, said circumferential groove is communicated with said pressure generation communicating port.

8. An apparatus as claimed in claim 5, wherein said pressure relief device is provided so as to allow an excess discharge fluid pressure from said pump to return to said reservoir.

9. An apparatus as claimed in claim 8, wherein said flow switching means is provided on each of said flow valves.

10. An apparatus as claimed in claim 4, wherein said flow switching means comprises a control valve, disposed on said pump communicating port of at least one of said flow valves, so that when at least said pump is operating and said spool is in said stationary position, said pump communicating port of said flow valve is closed, and by moving said spool to said operating position, said pump communicating ports of said flow valve is opened.

11. An apparatus as claimed in claim 10, wherein said control valve comprises:

(a) a valve part which allows said pump communicating port to be opened or closed, and when said spool is moving to said operating position, said valve part is pushed by said spool thereby opening said pump communicating port; and (b) a control spring which biases said valve part in a direction to close said pump communicating port.

12. An apparatus as claimed in claim 11, wherein a pressure relief device is provided so as to allow an excess discharge fluid pressure from said pump to return to said reservoir.

13. An apparatus as claimed in claim 12, wherein said flow switching means is provided on each of said flow valves.

14. An apparatus as claimed in claim 10, wherein said control valve comprises
   (a) a valve part which allows said pump communicating port to be opened or closed, and when said spool is moving to said operating position, said valve part is pushed by said spool thereby opening said pump communicating port; and
   said valve part is provided with:
   (b) a pressure differential generation means generates a pressure difference between spool side of said valve part and the opposing side of said valve part generated by a flow of discharging fluid from said pump to hold said valve part in a closed position by said pressure difference to close off said pump communicating port.

15. An apparatus as claimed in claim 1, wherein said flow switching means further comprises flow switching electromagnetic normally-closed valve which is controlled by said controller, and is disposed between the discharge side of said pump and said flow valve.

16. An apparatus as claimed in claim 15, wherein said flow valve is as claimed in claim 4.

17. An apparatus as claimed in claim 1, wherein said flow switching means further comprises a normally-closed switching valve which is disposed between the discharge fluid circuit of said pump and said flow valve, and is opened when the brake fluid pressure in a wheel cylinder circuit operatively connected to said normally-closed switching valve is lower than the brake fluid pressure by a predetermined fluid pressure in said pressure generation source, or the brake fluid pressure in the fluid discharge circuit of said pump.

18. An apparatus as claimed in claim 17 wherein said flow valve is as claimed in claim 4.

* * * * *